United States Patent
Enzenhofer et al.

(10) Patent No.: US 9,725,368 B2
(45) Date of Patent: Aug. 8, 2017

(54) SELF-SETTING CEMENT FOAM

(71) Applicant: Geolyth Mineral Technologie GmbH, Traun (AT)

(72) Inventors: Karl Enzenhofer, Traun (AT); Maximilian Buchberger, Traun (AT)

(73) Assignee: Geolyth Mineral Technologie GmbH, Traun (AT)

( * ) Notice: Subject to any disclaimer, the term of this patent is extended or adjusted under 35 U.S.C. 154(b) by 157 days.

(21) Appl. No.: 14/407,581

(22) PCT Filed: Jun. 12, 2013

(86) PCT No.: PCT/AT2013/050120
§ 371 (c)(1),
(2) Date: Dec. 12, 2014

(87) PCT Pub. No.: WO2013/185161
PCT Pub. Date: Dec. 19, 2013

(65) Prior Publication Data
US 2015/0152014 A1    Jun. 4, 2015

(30) Foreign Application Priority Data

Jun. 14, 2012 (AT) .................. A 686/2012

(51) Int. Cl.
*C04B 38/10* (2006.01)
*C04B 28/02* (2006.01)
*C04B 111/28* (2006.01)

(52) U.S. Cl.
CPC ............ *C04B 38/106* (2013.01); *C04B 28/02* (2013.01); *C04B 2111/28* (2013.01)

(58) Field of Classification Search
CPC ....................................................... C04B 38/10
See application file for complete search history.

(56) References Cited

U.S. PATENT DOCUMENTS

| | | | | |
|---|---|---|---|---|
| 5,520,729 | A * | 5/1996 | Engert | .................... C04B 28/18 106/601 |
| 5,871,677 | A | 2/1999 | Falke et al. | |
| 6,547,871 | B2 * | 4/2003 | Chatterji | ................. C04B 24/14 106/672 |
| 2006/0013062 | A1 | 1/2006 | Gembala | |
| 2010/0127476 | A1 | 5/2010 | Gembala | |
| 2015/0083958 | A1 * | 3/2015 | Bernardi | ................. C04B 28/02 252/62 |

FOREIGN PATENT DOCUMENTS

| | | |
|---|---|---|
| CA | 2144250 A1 | 9/1995 |
| DE | 43 27 074 A1 | 2/1995 |
| EP | 0 673 733 A2 | 9/1995 |

(Continued)

OTHER PUBLICATIONS

International Search Report of PCT/AT2013/050120, mailed Oct. 24, 2013.

*Primary Examiner* — Paul Marcantoni
(74) *Attorney, Agent, or Firm* — Collard & Roe, P.C.

(57) ABSTRACT

The invention relates to a self-setting porous cement foam (2) comprising a protein foam as the structuring agent, the cement foam (2) having pores when set, and the cement foam has a water absorption coefficient of between 0.5 and 7 kg/(m²·h0.5).

5 Claims, 2 Drawing Sheets

(56) References Cited

FOREIGN PATENT DOCUMENTS

Figure 1:
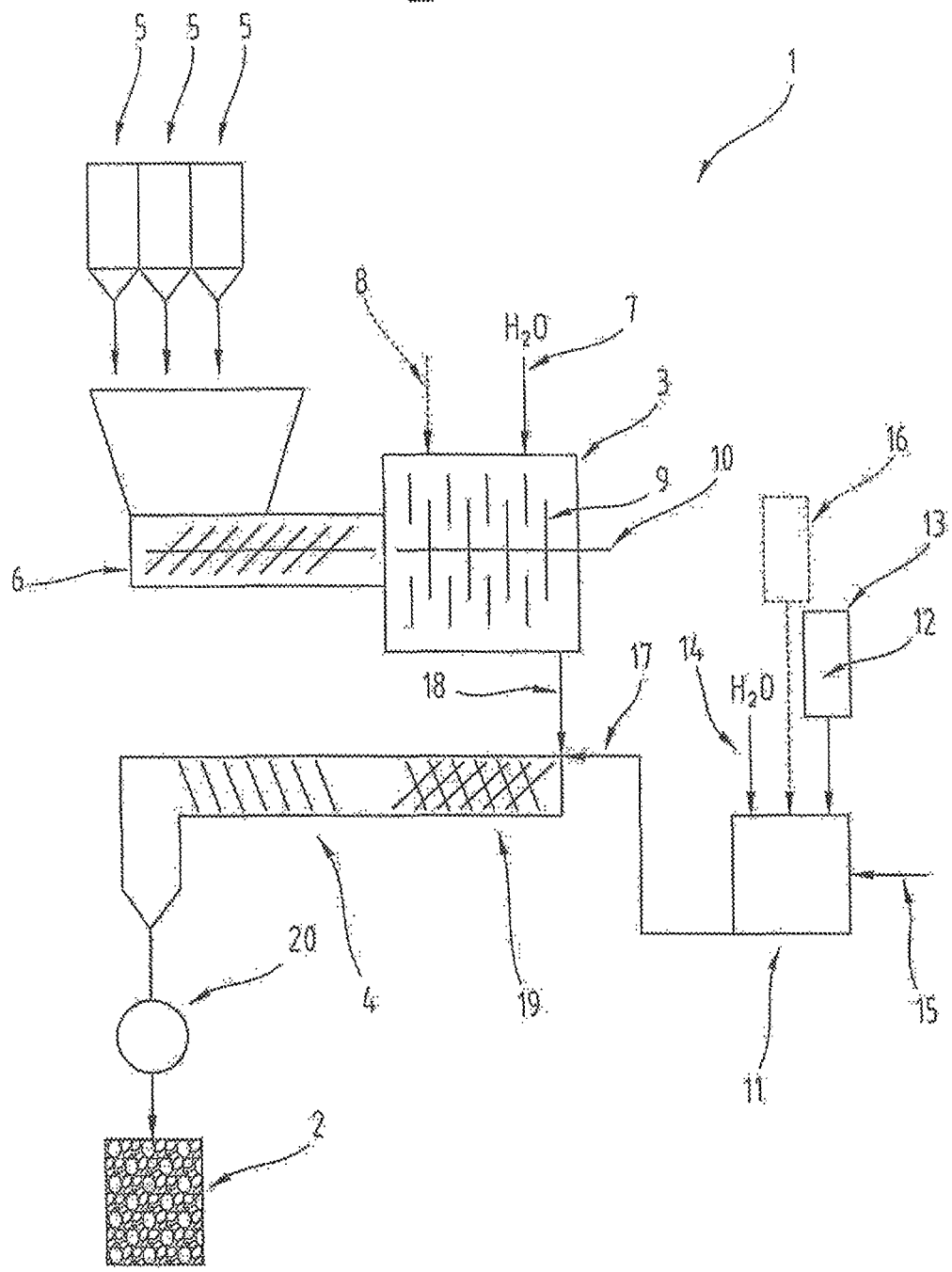

| | | |
|---|---|---|
| EP | 0 816 303 B1 | 1/1998 |
| EP | 2 354 109 A2 | 8/2011 |
| WO | 2008130107 A1 | 10/2008 |
| WO | 2011/044604 A1 | 4/2011 |
| WO | 2011/044605 A1 | 4/2011 |

* cited by examiner

SELF-SETTING CEMENT FOAM

CROSS REFERENCE TO RELATED APPLICATIONS

This application is the National Stage of PCT/AT2013/050120 filed on Jun. 12, 2013, which claims priority under 35 U.S.C. §119 of Austrian Application No. A 686/2012 filed on Jun. 14, 2012, the disclosure of which is incorporated by reference. The international application under PCT article 21(2) was not published in English.

The invention relates to a self-setting porous cement foam comprising a protein foam as the structuring agent, the cement foam having pores when set.

The invention further relates to a method for producing a cement foam.

Also included in the subject matter of the invention is a foam gun for producing a structure-imparting foaming component for a cement foam.

The invention further relates to a device for producing a cement foam.

Cement foams are already known from the prior art. For example, DE 4327074 describes a method for producing a cement foam which is reinforced with glass fibers and baked in an autoclave. However, such cement foams are very complex to produce. EP2354109A2 describes a cement foam of the type outlined above, whereas DE4327074 discloses a device and a foam gun. WO 2011/044605 relates to a method of producing a cement foam.

Self-setting cement foams, in other words cement foams which do not require an autoclave for setting purposes and which set in ambient conditions, usually have a disadvantage in that at low densities, only very low values can be achieved with them in terms of surface load.

Accordingly, the objective of the invention is to propose a self-setting cement foam having good heat insulation properties and improved mechanical stability.

This objective is achieved by the invention on the basis of a cement foam of the type outlined above, the cement foam having a water absorption coefficient of between 0.5 and 7 kg/(m$^2$·h0.5). At this stage, it should be pointed out that the value of the water absorption co-efficient is determined in accordance with DIN EN 52617. The value proposed by the invention for the water absorption coefficient also results in a specific structure of the set cement foam.

Accordingly, the cement foam may have pores with a size of between 0.02 and 10 mm, in particular between 0.03 and 7 mm, and the proportion of pores with a diameter of 0.03 to 0.9 mm inclusive is 60 to 75%, in particular 70%. In addition to pores of the sizes specified above, the cement foam may naturally also have a smaller number of pores of a smaller or larger diameter.

It has been found that with the configuration proposed by the invention, optimum values can be achieved in terms of strength as well as very good heat insulation properties at the same time.

The heat insulation properties of the cement foam proposed by the invention can be further improved without any reduction in static properties if the proportion of pores with a size of 2 to 7 mm inclusive is 6-8%, in particular 7%.

When set, the cement foam proposed by the invention can take a surface load of 1500 to 10000 kg/m$^2$ and has a density of 50 to 250 kg/m$^3$. Such values for surface load with such a low density cannot be achieved with conventional self-setting cement foams.

Based on a preferred embodiment of the invention, the cement foam is fully set within 85 min. By "fully set" is meant that the cement foam is in a dimensionally stable state and can be further processed without restriction. The specified time for the setting process relates to the setting time under normal conditions. Due to the short setting time, the cement foam proposed by the invention can be very quickly subjected to further processing on site.

The aforementioned objective is also achieved by means of a foam gun of the type mentioned above, due to the fact that the foam gun is of a tubular design and the foam gun has an inlet orifice for a liquid and an inlet orifice for a gas or gas mixture, and at least one first mesh is disposed downstream of the inlet orifices and at least one second mesh is disposed in front of an outlet orifice from the foam gun and, disposed in the space between the at least one first mesh and the at least one second mesh is at least one foaming element having a plurality of baffle structures specifically designed to create a turbulent flow between the at least one first and the at least one second mesh. Due to the special design of the foam gun, the structured foam produced with it has a very good inner structure.

Based on another advantageous embodiment of the foam gun which is distinctive due to an optimal air intake, its cross-section tapers towards the inlet orifice for the liquid, and the inlet orifice for the gas or gas mixture is disposed in a flank of a portion which tapers towards the inlet orifice for the liquid. With this embodiment of the invention, the gas mixture, which is preferably ambient air, is very efficiently mixed with the inflowing liquid (for example a mixture of water and foaming agent).

Based on a preferred embodiment of the invention, the space between the at least one first mesh and the at least one second mesh may be fully occupied by the at least one foaming element. This variant of the invention is distinctive due to the fact that it is able to produce an optimum inner structure and high strength of the foam for a relatively short length of the foam gun.

The underlying objective of the invention can also be achieved by a device of the type mentioned above, which has a foam gun of the type proposed by the invention, and an outlet orifice of the foam gun is connected to a mixing chamber in which the cement paste is mixed with the protein foam to produce the cement foam.

The above-mentioned objective can also be achieved by a method of the type mentioned above, whereby the structure-imparting protein foam is mixed with a cement paste using a device of the type according to one aspect of the invention, and the structure-imparting protein foam has a density of 36 to 82 kg/m$^3$ inclusive, and the structure-imparting protein foam is produced with a foam gun according to another aspect of the invention.

To provide a clearer understanding, the invention will be described in more detail below with reference to the appended drawings illustrating an example of an embodiment, although this is not intended to be restrictive.

Figure 2:
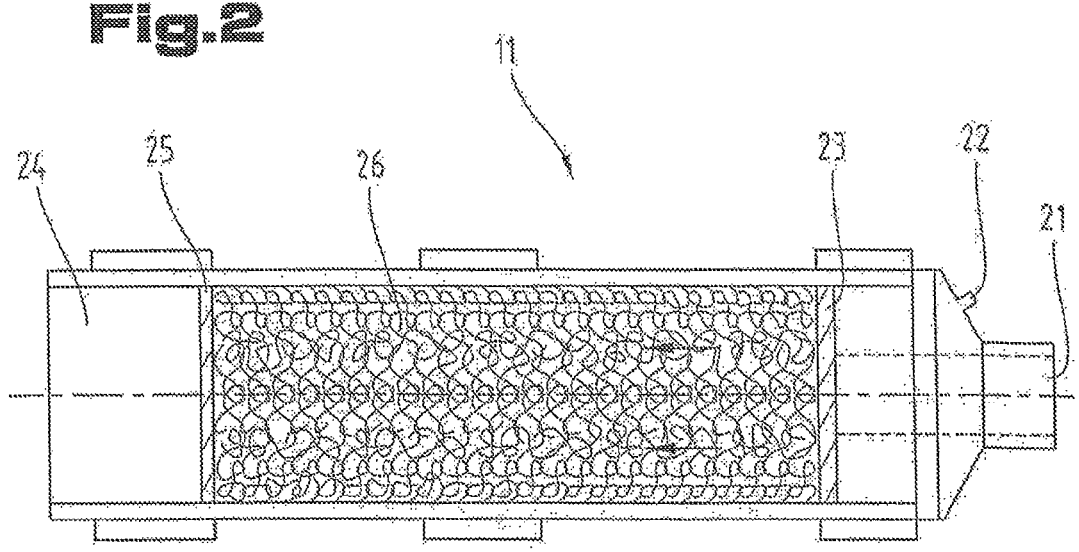

The highly schematic, simplified diagrams illustrate the following:

FIG. 1 a block diagram of a device proposed by the invention;

FIG. 2 a cross-section through a foam gun proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

As proposed by the invention, a self-setting porous cement foam 2 contains a protein foam as the structuring agent, and the cement foam has a water absorption coefficient of between 0.5 and 7 kg/(m²·h0.5). The water absorption coefficient (w value) may be determined in accordance with standard DIN EN 52617.

In a set state, the cement foam has pores with a size of between 0.02 and 10 mm extending through it. The size of most pores is preferably between 0.03 and 7 mm. The proportion of pores with a diameter of 0.03 to 0.9 mm inclusive in a cement foam 2 proposed by the invention may be between 60 and 75%, but is preferably ca.70%.

Furthermore, the cement foam may have a closed cell ratio as stipulated by DIN EN 4590 of between 0.5 and 10%, but preferably between 1 and 7%. The cement foam proposed by the invention may be used, for example, as an insulating board, as a filling for tiles and bricks, for precast concrete, for example as an intermediate insulating layer, etc.

The properties of the cement foam may vary depending on the application.

One of the advantages of the invention resides in the fact that the cement foam 2 is self-setting and does not have to be autoclaved, whilst offering outstanding properties in terms of its surface load and heat insulation. For example, the cement foam 2 proposed by the invention can take a very high surface load for a low density. The setting time of the cement foam proposed by the invention under normal conditions is at most 85 minutes, but preferably ca. 60 min.

In order to produce the cement foam 2 proposed by the invention, the device 1 has a first mixing line 3 and, disposed downstream of it in the production direction, a second mixing line 4. In the first mixing line 3, a so-called cement paste is made from powdered cement, which can be held in readiness in supply containers 5, for example, and fed to the first mixing line 3 via a conveyor device 6, for example a screw conveyor, and water is added as indicated by arrow 7, in other words a mixture is prepared from the solid components and water. Normal mains water is usually used for the water, although it would naturally also be possible to use distilled, de-ionized or cleaned water. If necessary, other additives may be fed into the first mixing line 3 for admixing with the powdered cement, as indicated by arrow 8 in broken lines in FIG. 1, in which case at least individual ones of the additives may also be added in liquid or dispersed form.

One option is to mix the powdered elements before adding the water indicated by arrow 7, in other words these additives and processing aids can be added to the cement for producing the cement foam 2 and these powdered components can be optionally pre-mixed.

Mixing line 3 is provided in the form of a paddle mixer or ploughshare mixer, although other types of mixer may also be used, e.g. freefall mixers. However, the advantage of the first of the aforementioned mixer types is that less water has to be added—the aim being to use as little water as possible—and the energy consumption per m³ cement paste is relatively low. In addition, the risk of the mixer becoming clogged can be reduced due to these rounded shapes. In particular, this mixing line 3 may have mixing elements 9 which are disposed in an offset arrangement in the radial direction on a mixing shaft 10. Accordingly, between 2 and 20 mixing elements 9 may be provided in mixing line 3, for example.

A protein foam generated in a foam gun 11 is then added to the cement paste as the foaming component. The foam gun 11 is illustrated in more detail in FIG. 2 and will be explained later on. Accordingly, the cement foam 2, i.e. the cement for the cement foam 2 proposed by the invention, is not foamed directly. Instead, the pores are formed in the cement foam 2 by adding a separate foam. To this end, a protein foam is used as the foaming component. As the protein 12, which is held in readiness in an appropriate supply container 13, an animal or vegetable protein may be used or mixtures thereof. For example, the protein 12 might be a keratin, a hydrolyzed keratin, or preferably a soya-based protein which is preferably alkali-resistant. The protein may be added in a quantity of up to 5 parts by weight, for example.

Water, in particular distilled or cleaned water, is in turn added to this protein 12 as indicated by arrow 14 and the protein foam is generated in the foam gun 11 by blowing in air as indicated by arrow 15.

As indicated by broken lines in the region of the foam gun 11 in FIG. 1, processing additives may also be added to this foaming component, e.g. from a supply container 16, and in the situation where several processing additives are added, these additives may be pre-mixed beforehand.

Generally speaking, it should be pointed out that these processing additives which are added to the foaming component may be added in powdered or dissolved or dispersed form.

As indicated by arrow 17, the finished foaming component is then added to the cement paste originating from the first mixing line 3 as indicated by arrow 18, and this addition takes place in the second mixing line 4 or preferably before the second mixing line 4. To this end, a conveyor device 19, e.g. a screw conveyor, may be disposed upstream of this mixing line 4, in which case the foam can be introduced into the conveyor device 19 first of all so that the latter is at least more or less completely filled with it, after which the cement paste is added to the foam, in particular in steps, and it is also possible to provide several orifices for filling the conveyor device 19 with cement paste. Alternatively or in addition, however, another option is one where the cement paste is not added to the foam until the second mixing line 4.

The second mixing line 4 is provided in particular in the form of a paddle, screw, helical or static mixer or in the form of a combination of these or individual ones of these mixer types.

In the context of the invention, one option is for the two mixing lines 3, 4 to be combined in a single mixer, in which case they may also be separate from one another, in other words disposed one after the other in this mixer.

Another option is for the first and/or second mixing line 3, 4 to be provided as a separate conveyor device 6 respectively 19 and a separate mixer, the separation being based on nothing more than the fact that the latter have separate drives to permit different speeds and hence a better mixing result with as low an energy consumption as possible.

The finished mixture comprising the cement paste and foaming component is then discharged from the second mixing line 4 via an appropriate conveyor unit 20 and this mixture can be introduced into an appropriate mold where the cement paste 2 will set of its own accord due to the corresponding chemical reactions that will occur.

It should be pointed out that the cement foam 2 proposed by the invention may be produced in the shape of panels, for example, so that these can subsequently be applied to structure parts such as walls, for example, and another option is to use the mixture to at least partially fill construction elements, for example (cavity) bricks, for example bricks or blocks. Other moldings of the cement foam 2 are also possible, e.g. stones, sanitary elements, elements used in the floor region, for example in underfloor heating systems, etc.

Within the context of the invention, although this is not illustrated in FIG. 1, any requisite regulating and/or control equipment and/or measuring equipment may be provided inside the device 1 and this regulating and/or control equipment and/or measuring equipment may naturally also be operated with EDP support.

Another option in connection with producing the foam is to use gases other than air, such as N2, CO2, etc., for example. Another option is to add an alkaline propellant in particular to the protein so that there is no need to add a separate gas for foaming the protein or the quantity of gas can be reduced.

The foaming component preferably also contains at least one cross-linking agent, which may be provided in the form of vegetable-based albumen in particular.

It should be pointed out at this stage that the number of mixing elements 9 chosen for the first mixing line 3 offers advantages, as mentioned above, in terms of the product properties of the cement foam 2. Although a cement foam 2, i.e. a cement paste, can be produced using a lesser or greater number of mixing elements 9 than those specified, it has been found on testing the invention that using a number of mixing elements 9 from the specified range improves the product properties of the cement foam 2. It should be pointed out that the number of mixing elements 9 is correlated to a specific size of the device 1, in other words to a specific output by volume of cement foam 2, namely up to 50 m3/h. This being the case, it may be that a number of mixing elements 9 other than the specified number will prove to be of advantage if the plant 1 is designed differently.

Also within the context of the invention, it has been found that advantages can also be gained in terms of the product properties of the cement foam 2 if a circumferential speed at which mixing shaft 10 of mixing line 3 is operated is selected from a range with a lower limit of 4 m/s, in particular 5.5 m/s, and an upper limit of 12 m/s, in particular 11 m/s, for the specified output volume. In this respect, it is of particular advantage if the number of mixing elements 9 is selected as being 16 at a circumferential speed of 4 m/s and the number of mixing elements 9 is selected as being 4 at a circumferential speed of 11 m/s for the mixing shaft 10, and these figures should be understood as meaning a lower and upper limit of a range for the number of mixing elements 9 in conjunction with the circumferential speed of the mixing shaft 10.

In this connection, it should also be pointed out that in particular for the first mixing line 3, but also for the second mixing line 4, combinations of different types of mixing elements 9 may be used, for example five stator bars and four paddle bars as the rotor. In general terms, a combination of stator and rotor bars may be used in the mixing lines 3, 4.

For a flow quantity of between 5 kg/min, in particular 15 kg/min, and 50 kg/min, in particular 35 kg/min, of the powdered elements producing the cement paste, a water volume of between 150 l/h, in particular 300 l/h and 1000 l/h, in particular 700 l/h, can be fed to the first mixing line 3. In his context, a correlation with the number of mixing elements 9 in the first mixing line 3 was again observed in terms of the product properties of the cement foam 2. If the number of mixing elements 9 used is 6, it is of particular advantage to add water in a flow volume of 250 l/h and if the number of mixing elements 9 used is 18, a flow volume of 800 l/h water is added to the powdered elements of the cement for producing the cement paste 2, and these figures should also be understood as representing a lower and upper limit of a range for the number of mixing elements 9 in conjunction with the water flow volume.

In terms of adding the water to the powdered cement in the first mixing line 3, it is of advantage if the water is added in an arrangement distributed across several regions of the mixing line 3, in particular by means of spray nozzles. For example, between 2 and 10, in particular between 3 and 6, spray nozzles may be distributed around the circumference of the first mixing line 3.

Per part by quantity of cement paste, it is preferable if between 30 parts by volume and 60 parts by volume of foaming component are discharged from the foam gun 11 into the second mixing line 4, in particular between 40 and 50 parts by volume of foaming component.

The foaming component preferably has a density selected from a range with a lower limit of 36 kg/m3 and an upper limit of 82 kg/m3.

The circumferential speed at which the second mixing line 4 is operated is preferably lower than that of the first mixing line 3 for the production volume and flow volume of added foaming component specified above. The mixing elements of the second mixing line 4 are disposed in such a way that the cement paste and foaming component are mixed homogeneously within the mixing line 4 and mixing of the foaming component with the cement paste is gentle.

The device 1 proposed by the invention and the method proposed by the invention can be used to produce a cement foam 2 with a weight by volume of 80 kg/m3, for example, in particular a weight by volume of between 50 kg/m3 and 250 kg/m3. This figure relates to the fully dried cement foam 2.

As illustrated in FIG. 2, the foam gun 11 has an inlet orifice 21 for a mixture of protein and water and an inlet orifice 22 for air. Disposed downstream of inlet orifices 21, 22 is a first mesh 23 or a block comprising several meshes disposed one after the other. A mesh 25 or a block comprising several meshes disposed one after the other is also provided in front of an outlet orifice 24 of the foam gun 11. Disposed in the space between the meshes 23 and 25 is one or a plurality of foaming elements 26 with a plurality of baffle structures specifically designed to create a turbulent flow. To this end, the foaming element 26 may occupy the entire space between the meshes. For example, the foaming element could be provided in the form of wire netting such as a wire sponge. However, it would also be possible to provide several foaming elements 26 made from plastic, for example based on a helical design, which are tightly packed one against the other in the space between the meshes 23 and 25. Instead of helical foaming elements 26, it would also be possible to use differently shaped foaming elements, for example elements with a cylindrical core with radially protruding projections. The foaming elements 26 or the foaming element may be taken out of the foam gun 11 and replaced once the meshes 23, 25 have been removed. The essential aspect of the foaming elements 26 is that they create a turbulent flow on the one hand and the flow path for the foaming agent through the foam gun 11 is increased so as to produce the desired stiffness of the foam at the outlet orifice 24 on the other hand 24 to produce the desired stiffness of the foam. In order to obtain the desired structure of the cement foam, it has proved to be of particular advantage if the mixture of protein and water flows through the inlet orifice 21 of the foam gun 11 at a pressure of between 0.5 and 5 bar, and at the outlet orifice 24 the foam flows out at a pressure of between 0.5 and 5 bar. For example, the pressure loss between the inflow and outflow end is between 0.1 and 1 bar and by particular preference the pressure loss in the foam gun 11 is ca. 0.5 bar. Accordingly, if the inflow pressure is 2.5 bar, the outflow pressure from the foam gun 11 is 0.5 bar.

Due to the foaming elements 24, a particularly homogeneous structure of the foam is produced and the structure of the protein foam is made stiffer, the density of the resultant structured foam being 36 to 82 kg/m$^3$.

In order to ensure that air is thoroughly mixed with the mixture of protein and water, the cross-section of the foam gun may taper towards the inlet orifice, and the inlet orifice for air may be disposed in a flank of a portion which tapers towards the inlet orifice for the liquid.

The embodiments illustrated as examples represent possible variants of the foam gun proposed by the invention and the device proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the foam gun proposed by the invention and the device proposed by the invention, they and their constituent parts are illustrated to a certain extent out of scale and/or on an enlarged scale and/or on a reduced scale.

LIST OF REFERENCE NUMBERS

1 Device
2 Cement foam
3 Mixing line
4 Mixing line
5 Supply container
6 Conveyor device
7 Arrow
8 Arrow
9 Mixing element
10 Mixing shaft
11 Foam gun
12 Protein
13 Supply container
14 Arrow
15 Arrow
16 Supply container
17 Arrow
18 Arrow
19 Conveyor unit
20 Conveyor unit
21 Inlet orifice
22 Inlet orifice
23 Mesh
24 Outlet orifice
25 Mesh
26 Foaming element

The invention claimed is:

1. A self-setting porous cement foam comprising a protein foam as the structuring agent, the cement foam having pores when set and a water absorption coefficient of between 0.5 and 7 kg/(m$^2$·h0.5),
   wherein when set, the cement foam has pores with a size of between 0.02 and 10 mm, and the proportion of pores with a diameter of 0.03 to 0.9 mm inclusive is 60 to 75%, and
   wherein the proportion of pores with a size of 2 to 7 mm inclusive is 6-8% when set.

2. The cement foam according to claim 1, wherein it has a surface load of 1500 to 10000 kg/m$^2$ when set.

3. The cement foam according to claim 1, wherein it has a density of 50 to 250 kg/m$^3$ when set.

4. The cement foam according to claim 1, wherein it is fully set within 85 min.

5. A method of producing a cement foam according to claim 1, wherein the structure-imparting protein foam is mixed with a cement paste, and a device for producing a self-setting cement foam is used, the device having a foam gun, and an outlet orifice of the foam gun is connected to a mixing chamber in which the cement paste is mixed with the protein foam to produce the cement foam, and the structure-imparting protein foam has a density of 36 to 82 kg/m$^3$ inclusive, and the structure-imparting protein foam is produced via the foam gun,
   wherein the foam gun is of a tubular design and has an inlet orifice for a liquid and an inlet orifice for a gas or gas mixture, and at least one first mesh is disposed downstream of the inlet orifices for the liquid and the gas or gas mixture and at least one second mesh is disposed in front of the outlet orifice from the foam gun and, disposed in the space between the at least one first mesh and the at least one second mesh is at least one foaming element having a plurality of baffle structures specifically designed to create a turbulent flow between the at least one first mesh and the at least one second mesh.

* * * * *